United States Patent [19]
Voss

[11] Patent Number: 5,220,809
[45] Date of Patent: Jun. 22, 1993

[54] APPARATUS FOR COOLING AN AIR CONDITIONING SYSTEM ELECTRICAL CONTROLLER

[75] Inventor: Mark G. Voss, Brighton, Mich.
[73] Assignee: Nartron Corporation, Reed City, Mich.
[21] Appl. No.: 776,086
[22] Filed: Oct. 11, 1991
[51] Int. Cl.[5] .............................................. F25B 41/00
[52] U.S. Cl. ........................................ 62/259.2; 62/113; 361/382; 165/80.4
[58] Field of Search ................... 62/259.2, 505, 513, 62/113; 361/382; 165/80.4

[56] References Cited

U.S. PATENT DOCUMENTS

| | | | |
|---|---|---|---|
| 1,808,617 | 6/1931 | Thompson | 165/80.4 |
| 3,192,735 | 7/1965 | Bernhard | 62/505 |
| 3,334,684 | 8/1967 | Roush et al. | 62/259.2 |
| 4,516,406 | 5/1985 | Gentry et al. | 62/513 |
| 4,616,693 | 10/1986 | Dietzsch | 165/41 |
| 4,720,981 | 1/1988 | Helt et al. | 62/113 |
| 5,029,635 | 7/1991 | Callerio et al. | 165/80.4 |

Primary Examiner—Albert J. Makay
Assistant Examiner—William C. Doerrler
Attorney, Agent, or Firm—Brooks & Kushman

[57] ABSTRACT

An apparatus (10) for cooling a vehicle air conditioning system electrical controller (20) includes a chill block (10) in juxtaposition to the controller (20). The chill block (10) includes a channel (22) that forms a cooling groove in heat exchange relation with the controller (20). The chill block (10) receives a portion of the refrigerant being circulated in the system (12). The portion of the refrigerant received expands in the chill block (10) to a saturated vapor and extracts heat from the controller (20) as the heat of vaporization from such expansion.

5 Claims, 2 Drawing Sheets

APPARATUS FOR COOLING AN AIR CONDITIONING SYSTEM ELECTRICAL CONTROLLER

TECHNICAL FIELD

This invention relates to automotive air conditioning systems using a liquid refrigerant and more particularly to cooling electrical controls for the system with the refrigerant in a compact manner.

BACKGROUND ART

Conventional automotive air conditioning systems include a condenser, evaporator and a compressor for circulating refrigerant to the evaporator and from the condenser. An electric motor is often employed to drive the compressor. This electric motor is controlled by a controller which generates heat when the system is operated. The heat generated by the controller often causes premature failure of the controller and effects its operation.

In some applications, a cooling fan is mounted in proximity to the controller to cool it. Use of such a fan requires an associated electrical circuit. The fan works in connection with a heat sink in communication with the controller which requires a large volume of space and is weighty. This application provides generally poor heat transfer away from the controller because of its low heat transfer coefficient.

SUMMARY OF THE INVENTION

An object of the present invention is to provide a compact cooling apparatus having a high heat transfer for an automotive air conditioning system electrical controller.

Another object of the invention is to provide a cooling apparatus for an automotive air conditioning system electrical controller that utilizes the system refrigerant.

Another object of the invention is to provide a cooling apparatus that uses a phase change, of a refrigerant to provide cooling of an electrical controller.

It is another object of the invention to provide a cooling apparatus for an automotive air conditioning system electrical controller that requires no moving parts.

A further object of the invention is to provide a cooling apparatus for an automotive air conditioning system electrical controller that requires minimal space.

In carrying out the above objects and other objects of the invention, the apparatus for cooling the electrical controller of an air conditioning system having a condenser, evaporator, expansion device and a compressor for circulating refrigerant to the evaporator from the condenser includes a chill block in juxtaposition to the controller. The chill block together with the controller forms a cooling groove in heat exchange relation with the controller. The cooling groove receives at least a portion of the refrigerant that is circulated to the evaporator. The portion of the refrigerant received into the groove expands in the chill block to a saturated vapor and extracts heat from the controller as the heat of vaporization from such expansion. Because of the latent change, every point along the cooling groove is at the same temperature while absorbing heat at a high rate.

Preferably, the groove is sufficiently configured to communicate saturated vapor only in heat exchange relation with the electrical controller. The preferred chill block is of a non-heat conductive material although metallic materials can be used.

In the preferred embodiment of the invention, the controller is a refrigerant compressor motor controller. Most preferably, the apparatus includes a sealing means of a heat conductive material to effect a seal or barrier between the chill block and electrical controller. A preferable sealing means is a gasketed aluminum plate wherein the gasket is an O-ring.

A method of cooling the electric controller having the characteristic of generating heat in a vehicle air conditioning system includes the steps of forming an auxiliary evaporator in heat exchange juxtaposition with the controller and circulating refrigerant through the auxiliary evaporator for extracting the heat of the controller. Preferably, the method includes the step of expanding the refrigerant to a saturated vapor and extracting heat from the controller as the heat of vaporization from such expansion.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
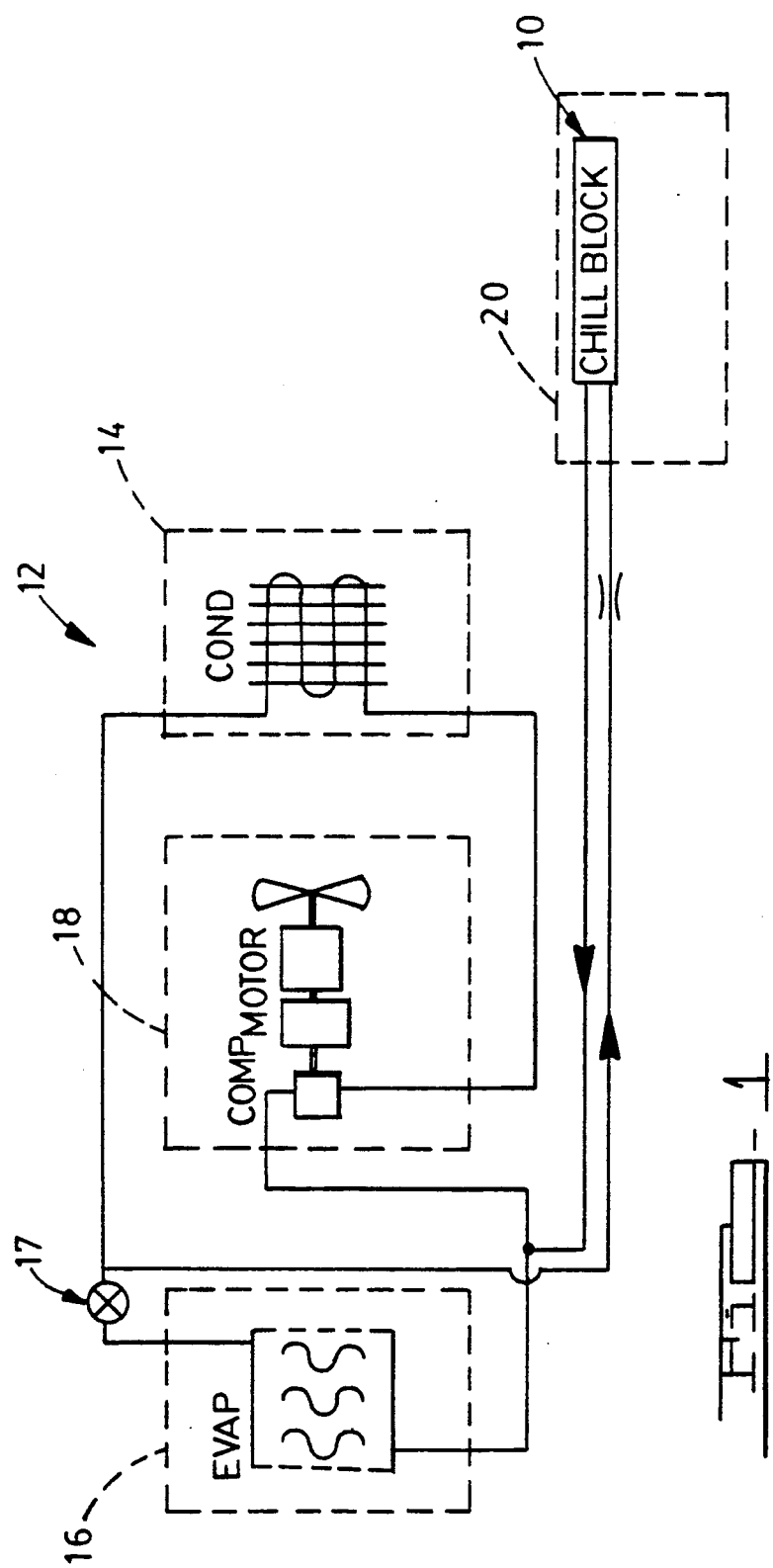
FIG. 1 is schematic view of an automotive air conditioning system including a condenser, evaporator, expansion device, electric motor driven compressor and an electrical controller illustrating an apparatus constructed in accordance with the present invention for cooling the electrical controller with the system refrigerant.

Referring to FIGS. 1-4 of the drawings, a cooling apparatus for an electrical component, herein a controller, is generally referred to by 10 and is used in an electrically operated automotive air conditioning system 12. The air conditioning system 12, illustrated in FIG. 1, includes a condenser 14, evaporator. 16, expansion device 17 and an electric motor driven compressor 18 for circulating refrigerant to the evaporator from the condenser. The cooling apparatus 10 has a high heat transfer capability, utilizes the system 12 refrigerant, has no moving parts and requires minimal space.

Figure 2:
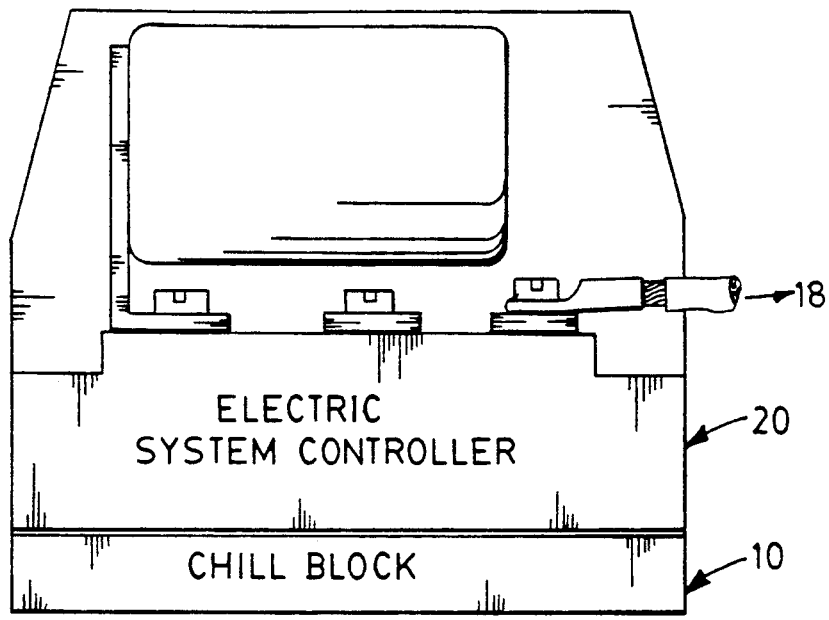
FIG. 2 is a schematic view of the electrical controller and cooling apparatus of FIG. 1.
Figure 3:
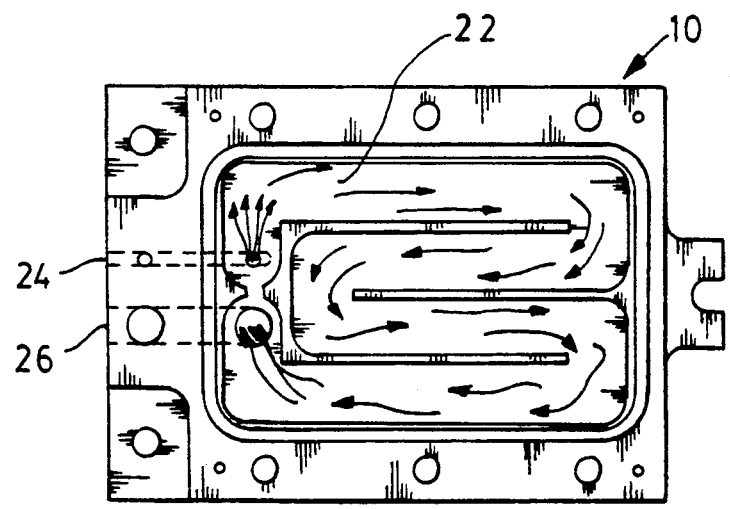
FIG. 3 is a plan view of the cooling apparatus illustrating a channel or groove in heat exchange relation with a controller for communicating the refrigerant.
Figure 4:
FIG. 4 is a sectional elevational view of the cooling apparatus of FIG. 3 illustrating a heat conductive seal member providing a barrier to seal off the refrigerant from the controller.

Referring to FIGS. 2-4 of the drawings, cooling apparatus 10 is a chill block in juxtaposition to a controller 20 for operating the electric motor driven compressor 18. Chill block 10 includes a channel 22 in one surface having an inlet 24 and outlet 26. Channel 22 forms a cooling groove in heat exchange relation with the controller 20 and receives at least a portion of the refrigerant being circulated to the evaporator 16. The portion of the refrigerant being circulated to the evaporator is received in the inlet 24 of the channel 22 wherein the refrigerant expands in the chill block to a saturated vapor and extracts heat from the controller as the heat of vaporization from such expansion. The rate of flow being governed by an orifice or a capillary tube at the chill block inlet 24.

Preferably, the channel 22 is sufficiently configured between inlet 24 and outlet 26 to communicate saturated vapor only in heat exchange relation with the controller 10. Such sizing of the channel 22 optimizes the rate of heat dissipation for a given refrigerant. The spent refrigerant is returned through outlet 26 to the compressor 18.

In the preferred embodiment of the invention, the chill block 10 is comprised of a non-heat conductive material because such a material is less susceptible to external heat infiltration. Conductive materials will also suffice.

As illustrated in FIGS. 2 and 4, the preferred apparatus 10 includes a thin aluminum plate 30 that effects a seal or functions as a barrier between the chill block 10 and electrical controller 20 so that the controller can be removed and replaced without leaking refrigerant. This plate 30 is of a heat conductive material, preferably aluminum, which transfers the heat from the controller 20 to the refrigerant.

A method of cooling the electric controller having the characteristic of generating heat includes the steps of forming an auxiliary evaporator in heat exchange juxtaposition with the controller and circulating refrigerant through the auxiliary evaporator for extracting the heat of the controller. The method includes expanding the refrigerant to a saturated vapor and extracting heat from the controller as the heat of vaporization from such expansion.

The following example is given for the sake of description and is not intended to be limiting of the scope of the invention.

EXAMPLE

When the chill block was originally tested, it was discovered that it took approximately 10 seconds before adequate cooling flow was established. Some transient thermal storage capacity was built in because the compressor motor control was producing heat during start-up conditions. The section thickness of the chill plate was increased from 0.0625" (structural adequacy) to 0.25" (structural adequacy plus transient thermal capacity). It was necessary that the plate was able to absorb the rated heat generated by the controller for 15 seconds while experiencing a maximum 50° F. temperature rise.

Q = heat generated = 1000 BTU/hr
Cp = specific heat of aluminum = 0.226 BTU/lb°F
A = plate area = 4.2" × 3.6" = 15.1 in²
V = plate volume = in³
H = plate thickness = V/A
$\gamma$ = specific weight of aluminum = 168 lb/ft³
$\Delta T$ = allowed temperature rise = 50° F.
W = weight of aluminum plate = lbs.
S = time to rise 50° F. = 15 seconds
Calculate required plate mass:

$$W = \frac{QS}{C_p \Delta T} =$$

$$\frac{1000 \text{ Btu}}{\text{HR}} \quad \frac{15 \text{ sec}}{1} \quad \frac{\text{lb °F.}}{.226 \text{ Btu}} \quad \frac{1}{50° \text{ F.}} \quad \frac{\text{HR}}{3600 \text{ sec}} = 0.37 \text{ lbs}$$

Calculate required plate volume:

$$V = \frac{W}{\gamma} = \frac{0.37 \text{ lbs}}{1} \quad \frac{\text{ft}^3}{168 \text{ lbs}} \quad \frac{1728 \text{ in}^3}{\text{ft}^3} = 3.8 \text{ in}^3$$

Calculate required plate thickness:

$$H = \frac{V}{A} = \frac{3.8 \text{ in}^3}{1} \quad \frac{1}{15.1 \text{ in}^3} = 0.25 \text{ in}$$

OR combining:

$$H = \frac{QS(0.48)}{C_p \gamma \Delta T A} = 0.25 \text{ in}$$

Any material with sufficient steady state conductivity can be used for this purpose with aluminum and copper being preferred. With plate heat storage capacity held in equivalency, aluminum is a better choice from a weight standpoint, while copper is optimum with volume as a constraint.

The plate material and thickness can obviously be tailored to meet any requirement for both transient and steady state cooling.

While the best mode for carrying out the invention has been described in detail, those familiar with the art to which this invention relates will recognize various alternative designs and embodiments for practicing the invention as defined by the following claims.

What is claimed is:

1. A cooling apparatus in combination with an electrically driven automotive air conditioning system including an electrical component and a liquid refrigerant for the system, the cooling apparatus comprising:
    a member having a channel having an inlet and outlet therein mounted on a surface of the component; the inlet of said channel being in communication with the refrigerant for receiving and communicating the refrigerant to the outlet; said member expanding the liquid refrigerant between the inlet and outlet to a saturated vapor which is thereby communicated in heat exchange relation with the electrical component, to cool the component; and
    a seal of an aluminum plate for effecting a seal between said member and component so that the component can be disconnected from the cooling apparatus without leaking refrigerant.

2. The combination of claim 1 wherein said seal means further includes an O-ring mounted between said aluminum plate and member.

3. Apparatus for cooling the electrical controller of an air conditioning system having a condenser, evaporator, expansion device and a compressor for circulating refrigerant to the evaporator and from the condenser, and comprising:
    a chill block that comprises a non-heat conductive plastic material in juxtaposition to said controller and forming therewith a cooling groove in heat exchange relation with said controller and receiving at least a portion of the refrigerant being circulated to the evaporator, said portion received into said groove expanding in the chill block to a saturated vapor and extracting heat from said controller as the heat of vaporization from such expansion.

4. Apparatus as in claim 3 wherein said sealing means is an aluminum plate.

5. Apparatus as in claim 4 wherein said sealing means further includes an O-ring mounted between said aluminum plate and chill block.

* * * * *